United States Patent Office

2,790,014
Patented Apr. 23, 1957

2,790,014
STABILIZED HYDROCARBONS

William W. Marshall, Anniston, Ala., assignor to Monsanto Chemical Company, St. Louis, Mo., a corporation of Delaware No Drawing. Application December 1, 1953,
Serial No. 395,611

2 Claims. (Cl. 260—666.5)

This invention relates to a hydrocarbon composition effectively stabilized against light-induced discoloration.

Hydrocarbon compositions to which this invention relates are those liquid hydrocarbon mixtures obtained by the partial hydrogenation of the normally solid hydrocarbons boiling above 350° C. which are formed during the synthesis of biphenyl by the pyrolytic process. The liquid hydrocarbon mixture is more particularly described in U. S. Patent No. 2,364,719, issued to Russell L. Jenkins.

One of the principal uses for the afore-mentioned liquid hydrocarbon mixture is as a plasticizer in vinyl plastics or in paint films. When plastic or paint films containing said liquid hydrocarbon mixture are exposed to light, photo-oxidation takes place with the resultant undesirable darkening of the films. Such darkening has been traced to an oxidation of the liquid partial hydrogenated hydrocarbon present in the film, and it has been further observed that the discoloration is markedly accelerated by the presence of manganese driers which are normally present in some paint films. The light-sensitivity of these liquid partial hydrogenation products has, accordingly, seriously limited the usefulness of this otherwise excellent product, especially where the product is exposed to light during its useful life.

I have now found that the liquid products obtained by partial hydrogenation of the solid hydrocarbons obtained in the pyrolysis of biphenyl can be effectively stabilized against discoloration by the action of light, by incorporating in such hydrocarbons a small amount of a compound represented by the formula:

$$(RO)_3P$$

where R is an organic radical having up to 18 carbon atoms, at least one R containing at least 3 and not more than 18 carbon atoms and an epoxy group. Compounds of this class possess sufficient solubility in the liquid partial hydrogenated hydrocarbons to be effective stabilizers.

Specific compounds contemplated by the above formula will be recognized as being organic phosphorus esters, the ester groups including at least one epoxy alkyl group and at the most three epoxy alkyl groups. By way of example only and without limitation, I may mention such compounds as: tris(2,3-epoxypropyl) phosphite, bis(2,3-epoxypropyl) propyl phosphite, 2,3-epoxypropyl diisopropyl phosphite, β(3,4-epoxycyclohexyl)-β-methoxyethyl diisopropyl phosphite, 9,10-epoxyoctadecyl diisopropyl phosphite and tris(9,10 epoxyoctadecyl) phosphite.

In order to test the effectiveness of the various products for light-stabilizing properties, 1% by weight of a compound to be tested was added to about 20 cc. of the liquid partially hydrogenated hydrocarbon, the sample placed in a 5 cm. petri dish open to the air and then exposed to light from a Westinghouse R. S. Sunlamp (110 volts–275 watts) placed about 16 inches above the sample. In order to test a number of samples at the same time, they were placed on a turntable which was slowly rotated so that all samples were equally exposed to the light.

After stated periods of time, the colors developed in the hydrocarbon samples were compared with Gardner Color Standards (1933) and a measure of depth of color thus obtained, which measure is an indication of the relative effectiveness of the inhibitors.

Illustrative of the results obtained there is given by way of example in the following table representative data obtained by the tests mentioned above.

TABLE

| | Gardner Color After Exposure to Light | | | | | |
|---|---|---|---|---|---|---|
| | 24 hrs. | 48 hrs. | 96 hrs. | 168 hrs. | 240 hrs. | 360 hrs. |
| Blank (no inhibitor) | 2-3 | 5+ | 6-7 | 7 | 8 | 9 |
| 9,10-epoxyoctadecyl diisopropyl phosphite | 1 | 1 | 2-3 | 3+ | 4-5 | 6+ |
| Tris (9,10-epoxyoctadecyl) phosphite | | 1 | 3 | ¹5 | | |
| Di-9,10-epoxyoctadecylmethane phosphonate | 2 | 5+ | 6-7 | 7-8 | | |

¹ After 192 hrs.

From the data presented above, it will be noted that a phosphonate containing two epoxy-containing radicals resulted in accelerated color formation compared to the blank test. On the other hand, the phosphite containing only one epoxy alkyl imparts effective color stabilization to the hydrocarbon.

The amount of the epoxy-containing phosphite inhibitor employed will depend upon the service in which the inhibited hydrocarbon composition is employed, that is, the amount and intensity of the light to which the product is exposed. Where exposure to direct sunlight is considerable, larger amounts, up to 5% by weight, may be employed. Where the exposure is restricted to diffused daylight for limited periods of time, the amount of inhibitor employed will be considerably smaller and may range downwardly from the above figure to as little as 0.1% by weight.

What I claim is:

1. A liquid partially hydrogenated hydrocarbon product obtained by the partial hydrogenation of the hydrocarbons, boiling above 350° C., which are obtained during the pyrolysis of benzene, said hydrocarbon product containing a small amount, sufficient to stabilize said product against light-induced discoloration, of a phosphite ester containing three ester groups, in which each of the ester groups contains not more than 18 carbon atoms, at least one of said ester groups containing the epoxy radical, and being further characterized in that each epoxy-containing ester group contains at least three carbon atoms.

2. A liquid partially hydrogenated hydrocarbon product obtained by the partial hydrogenation of the hydrocarbons, boiling above 350° C., which are obtained during the pyrolysis of benzene, said hydrocarbon product containing between 0.1% and 5.0% by weight thereof of 9,10-epoxyoctadecyl diisopropyl phosphite.

References Cited in the file of this patent

UNITED STATES PATENTS

| | | |
|---|---|---|
| 2,058,343 | Moran et al. | Oct. 20, 1936 |
| 2,364,719 | Jenkins | Dec. 12, 1944 |
| 2,485,341 | Wasson et al. | Oct. 18, 1949 |